US010789931B2

(12) United States Patent
Weik et al.

(10) Patent No.: US 10,789,931 B2
(45) Date of Patent: Sep. 29, 2020

(54) SOUND-ABSORBING TEXTILE COMPOSITE

(71) Applicant: Carl Freudenberg KG, Weinheim (DE)

(72) Inventors: Angela Weik, Bruehl (DE); Gunter Scharfenberger, Frankenthal (DE); Sandra Villing-Falusi, Heddesheim (DE)

(73) Assignee: CARL FREUDENBERG KG, Weinheim (DE)

( * ) Notice: Subject to any disclaimer, the term of this patent is extended or adjusted under 35 U.S.C. 154(b) by 360 days.

(21) Appl. No.: 15/805,161

(22) Filed: Nov. 7, 2017

(65) Prior Publication Data
US 2018/0268801 A1 Sep. 20, 2018

(30) Foreign Application Priority Data

Mar. 17, 2017 (DE) .................. 10 2017 002 552
Jul. 4, 2017 (EP) ..................... 17179654

(51) Int. Cl.
G10K 11/168 (2006.01)
B32B 5/20 (2006.01)
B32B 5/02 (2006.01)
B32B 5/08 (2006.01)
B32B 5/18 (2006.01)
B32B 5/24 (2006.01)
B60R 13/08 (2006.01)

(52) U.S. Cl.
CPC .......... G10K 11/168 (2013.01); B32B 5/022 (2013.01); B32B 5/08 (2013.01); B32B 5/18 (2013.01); B32B 5/20 (2013.01); B32B 5/245 (2013.01); B32B 2262/0284 (2013.01); B32B 2266/0278 (2013.01); B32B 2266/104 (2016.11); B32B 2307/102 (2013.01); B32B 2307/718 (2013.01); B60R 13/08 (2013.01); B60R 13/0815 (2013.01)

(58) Field of Classification Search
CPC ......... G10K 11/168; B32B 5/022; B32B 5/08; B32B 5/18; B32B 5/20; B32B 5/245; B32B 2266/0278; B32B 2307/102; B32B 2307/718; B60R 13/08; B60R 13/0815
USPC ....................................... 181/292
See application file for complete search history.

(56) References Cited

U.S. PATENT DOCUMENTS 4,283,457 A 8/1981 Kolsky et al.
5,298,694 A 3/1994 Thompson et al.
(Continued)

FOREIGN PATENT DOCUMENTS

CH 693409 A5 7/2003
DE 19821532 A1 11/1999
(Continued)

OTHER PUBLICATIONS

U.S. Appl. No. 15/803,890, filed Nov. 6, 2017.

Primary Examiner — Forrest M Phillips
(74) Attorney, Agent, or Firm — Leydig, Voit & Mayer, Ltd.

(57) ABSTRACT

In an embodiment, the present invention provides a sound-absorbing textile composite having a flow resistance of from 250 Ns/m3 to 5000 Ns/m3, including: a) at least one open-pore support layer including coarse staple fibers having a titer of from 3 dtex to 17 dtex and fine staple fibers having a titer of from 0.3 dtex to 2.9 dtex as scaffold fibers; and b) a flow layer arranged on the support layer, which flow layer includes a microporous foam layer.

20 Claims, 4 Drawing Sheets

(56) References Cited

U.S. PATENT DOCUMENTS

| | | | |
|---|---|---|---|
| 5,493,081 A | 2/1996 | Manigold | |
| 6,160,028 A * | 12/2000 | Dyer | C08F 291/00 521/63 |
| 6,231,940 B1 * | 5/2001 | Aichner | B32B 9/00 428/332 |
| 6,720,068 B1 | 4/2004 | Vanbemmel et al. | |
| 6,749,929 B1 | 6/2004 | Enkler et al. | |
| 2003/0077969 A1 | 4/2003 | Tanaka | |
| 2005/0026527 A1 | 2/2005 | Schmidt et al. | |
| 2006/0013996 A1 * | 1/2006 | Koyama | B32B 3/30 428/138 |
| 2006/0021823 A1 | 2/2006 | Kohara et al. | |
| 2006/0113146 A1 * | 6/2006 | Khan | B32B 5/18 181/286 |
| 2006/0128246 A1 | 6/2006 | Anderegg | |
| 2008/0003907 A1 * | 1/2008 | Black | D04H 1/559 442/327 |
| 2015/0204066 A1 * | 7/2015 | Kim | E04B 1/84 181/294 |
| 2015/0267401 A1 | 9/2015 | Nicolai | |

FOREIGN PATENT DOCUMENTS

| | | |
|---|---|---|
| DE | 10163576 B4 | 7/2006 |
| EP | 1058618 B1 | 2/2004 |
| EP | 2275253 A1 | 1/2011 |
| GB | 1250479 A | 10/1971 |
| GB | 2407296 A | 4/2005 |
| JP | 07152384 A | 6/1995 |
| JP | 08311759 A | 11/1996 |
| JP | 2001205725 A | 7/2001 |
| JP | 2002161464 A | 6/2002 |
| JP | 2003082568 A | 3/2003 |
| JP | 2004021246 A | 1/2004 |
| JP | 2007279649 A | 10/2007 |
| JP | 2009184296 A | 8/2009 |
| JP | 2012136803 A | 7/2012 |
| JP | 2015121631 A | 7/2015 |
| JP | 2015534113 A | 11/2015 |
| JP | 2016045450 A | 4/2016 |
| KR | 20050123137 A | 12/2005 |

* cited by examiner

SOUND-ABSORBING TEXTILE COMPOSITE

CROSS-REFERENCE TO PRIOR APPLICATION

Priority is claimed to German Patent Application No. DE 10 2017 002 552.5, filed Mar. 17, 2017, and European Patent Application No. EP 17 179 654.3, filed Jul. 4, 2017 the entire disclosures of which are hereby incorporated by reference herein.

FIELD

The invention relates to a sound-absorbing textile composite. The invention further relates to a method for the production thereof and to the use thereof for sound absorption in the automotive field.

BACKGROUND

U.S. Pat. No. 5,298,694 A describes a method for sound absorption in which an acoustically insulating nonwoven is used which comprises a proportion of microfibers (meltblown microfibers) mixed with a proportion of crimped bulking fibers. The microfibers have an average fiber diameter of less than 15 μm, preferably from 5 to 10 μm, and are distributed in the crimped staple fiber nonwoven in a ratio by weight of from 40:60 to 95:5. The acoustic effectiveness is obtained in this material structure by achieving a higher inner surface area in the nonwoven through the increased use of microfibers, so that the kinetic energy of the sound waves can increasingly be converted into heat energy. A disadvantage of the described nonwoven is that the air-flow resistance in the individual layers can be controlled or specified only by extensive variation of the structure of the overall design.

Insulating materials for absorbing sound waves and for thermal insulation are also known from DE 10163576 B4, which materials consist of two different thermoplastic matrix fibers (in the region of 0.8 and 1.7 dtex) as well as a proportion of thermoplastic fusible fibers (2.2 dtex). An average fiber diameter of 1.3 dtex is thereby achieved in the nonwoven as a whole. It is clear that the reduced use of binding fibers (10% of the fiber mixture) results in a nonwoven which has good draping properties and additionally has an inner strength of the nonwoven which is achieved by means of both mechanical and thermal bonding. However, for process-related reasons, it is not possible to purposively adjust the acoustics of the insulating material. In addition, the absorption of the sound waves cannot be improved further by the use of finer staple fibers because, according to the current prior art, finer fibers below 0.3 dtex cannot reliably be carried on carding machines.

EP 1058618 B1 describes a sound-absorbing thin-layer laminate which consists of an open-pore support layer and a second open-pore fiber layer. The open-pore support layer can be either a nonwoven having a weight per unit area of less than 2000 g/m² and a thickness of less than 50 mm or an ultra-light plastics foam having a density of from 16 to 32 kg/m³ and a thickness of at least 6 mm. The second open-pore fiber layer is produced from meltblown microfibers which have a fiber diameter of preferably from 2 to 5 μm. In addition, air-flow resistance of from 500 to 5000 Ns/m³ is described. As a result of the laminate-like structure of the sound-absorbing thin-layer laminate, a flow layer which can be acoustically adjusted is provided. A disadvantage of this composite is the fact that the support layer does not exhibit explicit acoustic relevance.

SUMMARY

In an embodiment, the present invention provides a sound-absorbing textile composite having a flow resistance of from 250 Ns/m3 to 5000 Ns/m3, comprising: a) at least one open-pore support layer comprising coarse staple fibers having a titer of from 3 dtex to 17 dtex and fine staple fibers having a titer of from 0.3 dtex to 2.9 dtex as scaffold fibers; and b) a flow layer arranged on the support layer, which flow layer comprises a microporous foam layer.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
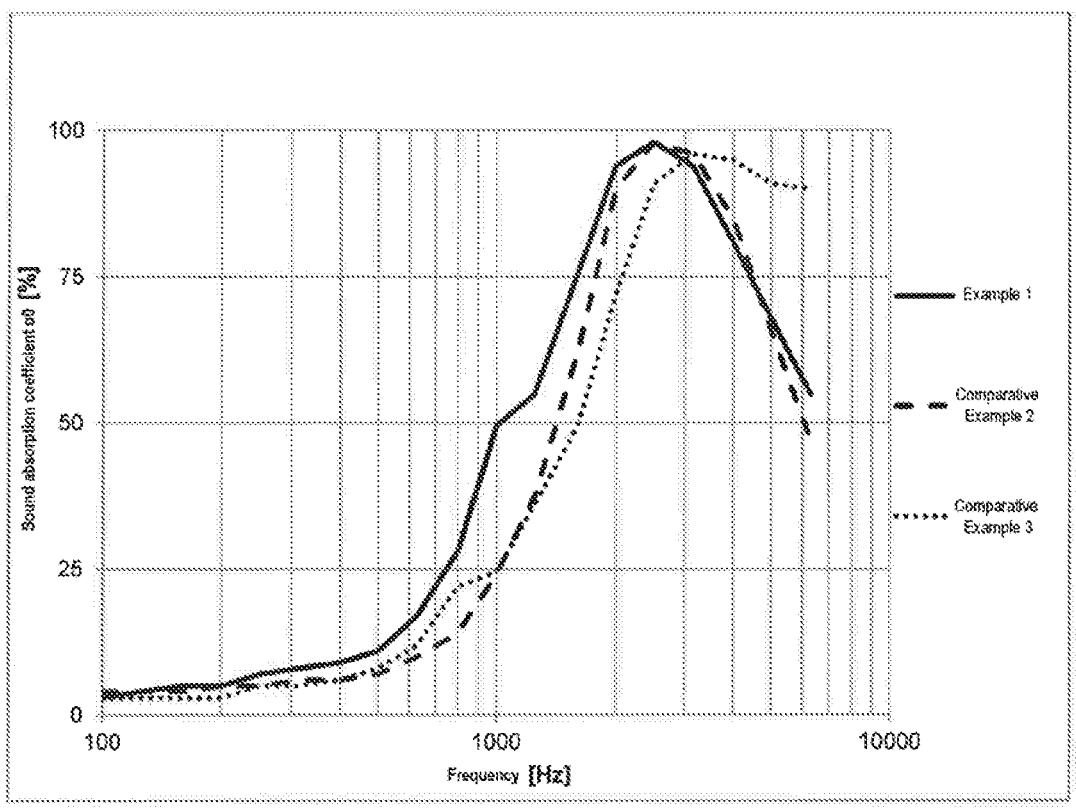
FIG. 1: Comparison of the sound absorption coefficient in the impedance tube (DIN EN ISO 10534) of Example 1 according to the invention with Comparative Examples 2 and 3.

In addition, the sound-absorbing material is intended to exhibit very good acoustic absorption properties in the frequency range of from 800 Hz to 2000 Hz that is significant for the automotive industry.

This problem is solved by a sound-absorbing textile composite, comprising at least one open-pore support layer comprising coarse staple fibers having a titer of from 3 dtex to 17 dtex, and fine staple fibers having a titer of from 0.3 dtex to 2.9 dtex as scaffold fibers, and a flow layer arranged on the support layer, which flow layer comprises a microporous foam layer, wherein the flow resistance of the sound-absorbing textile composite is from 250 Ns/m³ to 5000 Ns/m³.

Surprisingly, it has been found that the above-described disadvantages of the prior art can be avoided using the textile composite according to the invention. It has further been found that a textile composite of the above structure exhibits outstanding acoustic absorption properties in the frequency range of from 800 Hz to 2000 Hz that is significant for the automotive industry.

Without committing to a mechanism according to the invention, it is supposed that the surprisingly high sound absorption coefficient that has been found is attributable to a synergistic interaction between the fine fibers and the coarse fibers of the support layer in combination with the flow layer. Thus it is supposed that the particular selection of fine staple fibers having a titer of from 0.3 dtex to 2.9 dtex and coarse staple fibers having a titer of from 3 dtex to 17 dtex in the support layer permits the formation of a scaffold structure that is particularly suitable for sound absorption and is itself capable of absorbing sound waves. This is because the suitable selection of fine and coarse staple fibers makes it possible to provide the support layer with high compressibility and high resilience, so that the flow layer can optimally be made to oscillate on the support layer and sound energy can thus be absorbed particularly efficiently, according to the principle of a "flexible panel absorber".

In addition, the combination of an open-pore support layer and a microporous flow layer permits simple and purposive adjustment and variability of the acoustic properties of the textile composite. Furthermore, it has been found that the textile composite according to the invention can be manufactured so as to have high compressibility and good resilience while at the same time having low weights per unit area. Thus, in a preferred embodiment of the invention, the textile composite has a compressibility of from 70% to 100%, preferably from 75% to 100% and in particular from 80% to 100%, and/or a resilience of from 70% to 100%, preferably from 75% to 100% and in particular from 80% to 100%. As a result, the textile composite can easily be compressed and thus at the same time very easily be placed in the specified installation spaces since it is able to bounce back very well in the installation space because of its good resilience. This allows the composite to be installed even in installation spaces having difficult geometries and different thickness dimensions.

The support layer can in principle be a woven fabric, a knitted fabric and/or a nonwoven. According to the invention, the support layer is preferably a nonwoven according to DIN EN ISO 9092.

The fiber titer of the coarse staple fibers of the support layer is from 3 dtex to 17 dtex. In a preferred embodiment, the fiber titer is from 3 dtex to 12 dtex and in particular from 3 dtex to 9 dtex. The coarse staple fibers give the textile composite the necessary structure and thus ensure that the textile composite remains dimensionally stable even in the fitted state.

In a preferred embodiment of the invention, the support layer contains the coarse staple fibers in a proportion of from 5 wt. % to 90 wt. %, preferably from 10 wt. % to 90 wt. %, more preferably from 20 wt. % to 90 wt. %, more preferably from 30 wt. % to 90 wt. %, 40 wt. % to 90 wt. %, more preferably from 50 wt. % to 90 wt. % and in particular from 60 wt. % to 90 wt. %, in each case based on the total weight of the support layer. If the support layer contains binding fibers as further fibers, the proportion of coarse staple fibers is preferably from 5 wt. % to 85 wt. %, more preferably from 10 wt. % to 85 wt. %, more preferably from 20 wt. % to 80 wt. % and in particular from 30 wt. % to 75 wt. %, in each case based on the total weight of the support layer. If the support layer does not contain binding fibers as further fibers, the proportion of coarse staple fibers is preferably from 10 wt. % to 90 wt. %, more preferably from 20 wt. % to 90 wt. %, more preferably from 30 wt. % to 90 wt. %, more preferably from 40 wt. % to 90 wt. %, more preferably from 50 wt. % to 90 wt. %, more preferably from 60 wt. % to 90 wt % and in particular from 70 wt. % to 90 wt. %, in each case based on the total weight of the support layer.

The fiber titer of the fine staple fibers of the support layer of the textile composite according to the invention is from 0.3 dtex to 2.9 dtex. In a preferred embodiment, the fiber titer of the fine staple fibers is from 0.5 dtex to 2.9 dtex, preferably from 0.5 dtex to 2.5 dtex and in particular from 0.5 dtex to 2.0 dtex. By using fine staple fibers in the support layer, sound energy can be converted into heat energy in this layer too on account of the now larger inner surface area of the support layer.

In a preferred embodiment of the invention, the support layer contains the fine staple fibers in a proportion of from 10 wt. % to 90 wt. %, preferably from 10 wt. % to 80 wt. %, more preferably from 10 wt. % to 70 wt. %, more preferably from 10 wt. % to 60 wt. %, 10 wt. % to 50 wt. %, more preferably from 10 wt. % to 40 wt. % and in particular from 10 wt. % to 30 wt. %, in each case based on the total weight of the support layer.

According to the invention, the scaffold fibers are staple fibers. Unlike the binding fibers which may be contained in the support layer, the scaffold fibers are not or only negligibly fused. Unlike filaments, which theoretically have an unlimited length, staple fibers have a defined fiber length. According to the invention, the fine and coarse staple fibers used as scaffold fibers preferably have, independently of one another, a staple length of from 20 mm to 80 mm, preferably from 25 mm to 80 mm, in particular from 30 mm to 80 mm. Natural fibers, synthetic fibers or mixtures thereof may be used as scaffold fibers. Synthetic fibers are preferably used.

In a preferred embodiment of the invention, the fine and coarse staple fibers used as scaffold fibers contain, independently of one another, at least one polymer selected from the group consisting of: polyacrylonitrile, polyvinyl alcohol, viscose, polyamides, in particular polyamide 6 and polyamide 6.6, preferably polyolefins and most particularly preferably polyesters, in particular polyethylene terephthalate, polyethylene naphthalate and polybutylene terephthalate, mixtures and/or copolymers thereof. The scaffold fibers preferably contain the at least one polymer in a proportion of at least 90 wt. %, preferably at least 95 wt. %, in particular more than 97 wt. %.

In a particularly preferred embodiment of the invention, the scaffold fibers comprise at least one polymer selected from the group consisting of: polyesters, in particular polyethylene terephthalate, polyamide and mixtures or copolymers thereof. In a particularly preferred embodiment of the invention, the scaffold fibers are polyester fibers, in particular of polyethylene terephthalate. The advantage of such fibers is the self-extinguishing burning behavior of polyethylene terephthalate, which again is relevant for the use of the textile composite in the automotive field.

In addition to the fine staple fibers and the coarse staple fibers, the support layer can also include further fibers. According to the invention, the support layer preferably includes at least partially fused binding fibers as further fibers. The fibers which are conventionally used for this purpose can be used as the binding fibers, provided that they can be at least partially thermally fused. Binding fibers can be single fibers or also multicomponent fibers. Particularly suitable binding fibers according to the invention are fibers in which the binding component has a melting point which is below the melting point of the scaffold fibers that are to be bound, preferably at least 5° C., for example from 5° C. to 300° C., preferably from 5° C. to 250° C., more preferably from 5° C. to 200° C. and/or preferably at least 10° C., for example from 10° C. to 300° C., preferably from 10° C. to 250° C., more preferably from 10° C. to 200° C. and/or preferably at least 15° C., for example from 15° C. to 300° C., preferably from 15° C. to 250° C., more preferably from 15° C. to 200° C. and/or preferably at least 20° C., for example from 20° C. to 300° C., preferably from 20° C. to 250° C., more preferably 20° C. to 200° C. and/or preferably at least 25° C., for example from 25° C. to 300° C., preferably from 25° C. to 250° C., more preferably from 25° C. to 200° C. below the melting point of the scaffold fibers that are to be bonded. Further preferred are binding fibers in which the binding component has a melting point which is below 250° C., preferably from 70 to 235° C., more preferably from 125 to 225° C., particularly preferably from 150 to 225° C. Suitable binding fibers are in particular fibers which contain thermoplastic polyesters and/or copolyesters, in particular polybutylene terephthalate, polyolefins, in particular polypropylene, polyamides, polyvinyl alcohol, as well as copolymers and mixtures thereof, and/or which consist of those polymers.

Particularly suitable binding fibers according to the invention are multicomponent fibers, preferably bicomponent fibers, in particular core/sheath fibers. Core/sheath fibers contain at least two fiber polymers having different softening and/or melting temperatures. The core/sheath fibers preferably consist of these two fiber polymers. The component that has the lower softening and/or melting temperature is to be found on the fiber surface (sheath) and the component that has the higher softening and/or melting temperature is to be found in the core.

In core/sheath fibers, the binding function can be performed by the materials that are arranged on the surface of the fibers. A wide range of materials can be used for the sheath. According to the invention, preferred materials for the sheath are polybutylene terephthalate, polyamide, polyethylene, copolyamides and/or also copolyesters. A wide range of materials can likewise be used for the core. According to the invention, preferred materials for the core are polyesters, in particular polyethylene terephthalate and/or polyethylene naphthalate, and/or polyolefins.

The use of core/sheath binding fibers is preferred according to the invention because a particularly homogeneous distribution of the binder component in the nonwoven can thus be achieved.

If the support layer contains at least partially fused binding fibers, the support layer is preferably produced from a fiber mixture which contains the binding fibers in a proportion of from 10 wt. % to 50 wt. %, preferably from 10 wt. % to 40 wt. %, in particular from 10 wt. % to 30 wt. %, in each case based on the total weight of the support layer.

In a further preferred embodiment of the invention, the proportion of the binding component is more than 5 wt. %, for example from 5 wt. % to 50 wt. %, in each case based on the total weight of the support layer.

According to the invention, the support layer is preferably bound and bonded by the at least partially fused binding fibers. The partially fused binding fibers are preferably fused without a mechanical load, for example using a continuous furnace. This has the advantage that the nonwoven can be produced so as to have a high volume and does not lose volume due to mechanical action. In a further preferred embodiment of the invention, the air-to-fiber volume ratio in the support layer is from 50:1 to 250:1, preferably from 100:1 to 225:1, in particular from 125:1 to 200:1.

In a further embodiment of the invention, the support layer is bound by a binder, preferably in addition to being bonded by the binding fibers. Polyacrylates, polystyrenes, polyvinyl acetate-ethylene, polyurethanes and mixtures and copolymers thereof can be used as binders.

According to the invention, the support layer is preferably so lightly bonded that the sound-absorbing textile composite can easily be draped and compressed and can thus be used in a wide range of installation spaces.

According to the invention, a flow layer is to be understood as being a microporous layer which has a specific flow resistance, in particular of more than 200 $Ns/m^3$, for example from 200 $Ns/m^2$ to 5000 Ns/m, preferably from 250 $Ns/m^3$ to 5000 $Ns/m^3$, more preferably from 350 $Ns/m^3$ to 5000 $Ns/m^3$ and in particular from 450 $Ns/m^3$ to 5000 $Ns/m^3$. The advantage of providing the support layer with the flow layer is that the sound absorption properties of the support layer can be improved. The weight per unit area of the support layer can thereby be kept low and a product having outstanding acoustic properties can nevertheless be obtained. The adjustment of the flow resistance of the flow layer can be obtained in a manner known to a person skilled in the art by purposive adjustment of the pore sizes or density.

According to the invention, the flow layer has a microporous foam layer. In this case, a microporous foam layer is understood to be a cellular structure having an average pore diameter of less than 100 μm.

The advantage of using a microporous foam layer is that, owing to the plurality of small pores, a very large inner surface area is provided in the foam layer, at which area the sound energy can be absorbed particularly well. Accordingly, the microporous foam layer preferably has an average pore diameter of from 1 μm to 30 μm, preferably from 1 μm to 25 μm and in particular from 1 μm to 20 μm.

The microporous foam layer is preferably open-pore. Hereinafter, it should be understood that the cell walls are unclosed, at least in part, and therefore sound energy can also be absorbed inside the foam layer.

The microporous foam layer can be produced from a wide range of foam-forming materials. It has proven to be particularly suitable for the microporous foam layer to contain vinyl acetate copolymers and/or polyacrylate and/or polyurethane. In this case, the microporous foam layer preferably contains the above-mentioned polymers in a proportion of more than 90 wt. %, preferably more than 95 wt. %, more preferably more than 97 wt. %. In particular, the microporous foam layer consists of one or more of the above-mentioned polymers, it being possible for conventional additives to be contained.

The foam layer can be produced in the conventional manner by foaming polymer dispersions or polymer emulsions, for example by mechanical whipping, and applied by conventional application methods, for example coating methods.

The advantage of using vinyl acetate copolymers is that they are simple and cheap to produce. Foam layers produced therewith also have a particularly low tendency to yellow. Furthermore, the foam layers exhibit particularly low shrinkage.

Vinyl acetate-ethylene copolymers are preferred as vinyl acetate copolymers. Said copolymers can be produced for example by means of emulsion polymerization. According to the invention, the vinyl acetate copolymer is therefore preferably produced from an aqueous vinyl acetate emulsion and/or vinyl acetate dispersion, in particular from a vinyl acetate-ethylene emulsion and/or a vinyl acetate-ethylene dispersion containing from 65 to 98 wt. % vinyl acetate. A vinyl acetate-ethylene emulsion and/or a vinyl acetate-ethylene dispersion preferably contains 65 to 98 wt. % vinyl acetate and 2 to 30 wt. % ethylene, preferably 75 to 95 wt. % vinyl acetate and 5 to 25 wt. % ethylene in an aqueous medium, in each case based on the total weight of the monomers.

Optionally, the vinyl acetate emulsion and/or vinyl acetate dispersion additionally can also contain up to 10 wt. %, preferably 0.1 to 10 wt. % of further comonomers, in each case based on the total weight of the monomers.

Suitable further comonomers for the vinyl acetate emulsion and/or vinyl acetate dispersion are for example those from the group of vinyl esters having 3 to 12 C atoms in the carboxylic acid functional group, such as vinyl propionate, vinyl laurate and vinyl esters of alpha-branched carboxylic acids having 8 to 11 C atoms. Methacrylic acid esters or acrylic acid esters of unbranched or branched alcohols having 1 to 15 C atoms, such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate and norbornyl acrylate are also suitable. Vinyl halides, such as vinyl chloride, are also suitable.

Suitable further comonomers are also ethylenically unsaturated mono- and dicarboxylic acids, preferably acrylic acid, methacrylic acid, fumaric acid and maleic acid; ethylenically unsaturated carboxylic acid amides and nitriles, preferably acrylamide and acrylonitrile; mono- and diesters of fumaric acid and maleic acid such as diethyl- and diisopropyl esters, and maleic acid anhydride, and ethylenically unsaturated sulfonic acids or the salts thereof, preferably vinyl sulfonic acid, 2-acrylamido-2-methyl-propanesulfonic acid. Further examples are pre-crosslinking comonomers such as multi-ethylenically unsaturated comonomers, for example divinyl adipate, diallyl maleate, allyl methacrylate or triallyl cyanurate, or post-crosslinking comonomers, for example acrylamidoglycolic acid (AGA), methyl acrylamidoglycolic acid methyl ester (MAGME), n-methylol acrylamide (NMA), n-methylol methacrylamide (NMMA), n-methylol allyl carbamate, alkyl ethers, such as of isobutoxy ethers, or esters of n-methylol acrylamide, n-methylol methacrylamide and n-methylol allyl carbamate. Monomers having hydroxy or carboxyl groups, such as methacrylic acid esters and acrylic acid hydroxyalkyl esters, such as hydroxyethyl, hydroxypropyl or hydroxybutyl acrylate or methacrylate, and 1,3-dicarbonyl compounds such as acetoacetoxyethyl acrylate, acetoacetoxypropyl methacrylate, acetoacetoxyethyl methacrylate, acetoacetoxybutyl methacrylate, 2,3-di (acetoacetoxy) propyl meth polyacrylate and acetoacetic acid allyl esters, are also suitable.

In this case, the monomer selection is carried out such that the vinyl acetate copolymer, in particular the vinyl acetate-ethylene copolymer, has a glass transition temperature Tg of from $-20°$ C. to $+20°$ C., preferably from $-20°$ C. to $+0°$ C., more preferably from $-20°$ C. to $-10°$ C.

The glass transition temperature Tg of the polymers can be determined in a known manner by means of DSC (Dynamic Differential Thermal Analysis, DIN EN ISO 11357).

Most particularly preferably, a vinyl acetate copolymer having the brand name Vinamul® Elite 25 from the Celanese Emulsions company is used.

Polybutyl acrylates, hereinafter also referred to as butyl acrylates, are preferred polyacrylates. Butyl acrylates can also be produced by means of emulsion polymerization. The polyacrylate is therefore preferably produced from a polyacrylate emulsion and/or polyacrylate dispersion, in particular a butyl acrylate emulsion and/or butyl acrylate dispersion preferably containing at least 40 wt. %, more preferably at least 50 wt. %, particularly preferably at least 60 wt. % n-butyl acrylate or n-butyl methacrylate (short form: n-butyl (meth)acrylate); n-butyl acrylate is preferred.

In addition to the above-mentioned butyl acrylates, the polyacrylate emulsion and/or polyacrylate dispersion can contain further comonomers, preferably selected from C1 to C20 alkyl (meth)acrylates, vinyl esters of carboxylic acids containing up to 20 C atoms, vinyl aromatics having up to 20 C atoms, ethylenically unsaturated nitriles, vinyl halides, vinyl ethers of alcohols containing from 1 to 10 C atoms, aliphatic hydrocarbons having 2 to 8 C atoms and one or two double bonds or mixtures of these monomers. These include e.g. (meth)acrylic acid alkyl esters having a C1-C10 alkyl functional group, such as methyl methacrylate, methyl acrylate, ethyl acrylate and 2-ethylhexyl acrylate.

Post-crosslinking comonomers, for example acrylamidoglycolic acid (AGA), methyl acrylamidoglycolic acid methyl ester (MAGME), n-methylol acrylamide (NMA), n-methylol methacrylamide (NMMA), n-methylol allyl carbamate, alkyl ethers, such as of isobutoxy ethers, or esters of n-methylol acrylamide, n-methylol methacrylamide and n-methylol allyl carbamate are particularly preferred comonomers.

In this case, the monomer selection is carried out such that the polyacrylate, in particular the butyl acrylate, has a glass transition temperature Tg of $<-25°$ C., for example from $-50°$ C. to $-25°$ C., preferably from $-45°$ C. to $-25°$ C., more preferably from $-40°$ C. to $-25°$ C.

Most particularly preferably, a polyacrylate having the brand name Appretan® N 92100 from the Archroma company is used.

A wide range of polyurethanes can also be used for the foam layer. Aliphatic polyurethanes are preferred according to the invention, since they have only a low tendency to yellow. Polyester polyurethanes are particularly preferred. Polyurethanes produced from aqueous polymer dispersions are also particularly preferred. According to the invention, the polyurethane is particularly preferably produced by reacting at least one aliphatic or aromatic polyvalent isocyanate, diols, of which b1) 10 to 100 mol %, based on the total amount of the diols (b), have a molecular weight of from 500 to 5000, and 0 to 90 mol %, based on the total amount of the diols (b), have a molecular weight of from 60 to 500 g/mol, monomers which are different from (a), (b) and have at least one isocyanate group or at least one group that reacts with isocyanate groups, which monomers also carry at least one hydrophilic group or a potentially hydrophilic group, as a result of which the ability of the polyurethanes to disperse in water is brought about, in order to form a polyurethane in the presence of a solvent and subsequent dispersion of the polyurethane in water.

Aliphatic isocyanates in which all the isocyanate groups are bonded to an aliphatic chain are particularly preferred.

According to the invention, preferred aliphatic isocyanates comprise 4 to 12 carbon atoms. Preferred aliphatic isocyanates are tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, esters of lysine diisocyanate, tetramethylxylylene diisocyanate, trimethylhexane diisocyanate or tetramethylhexane diisocyanate; 1,6-hexamethylene diisocyanate being particularly preferred.

Preferred aromatic isocyanates according to the invention are: isophorone diisocyanate, toluene diisocyanates, dicyclohexylmethane diisocyanate, phenylene diisocyanate, 2,4- and 2,6-toluene diisocyanate, phenyl isocyanate, isocyanates of the diphenylmethane series, 1,5-naphthalene diisocyanate, p-chlorophenyl isocyanate, and carbodiimide-modified triisopropyl phenylene diisocyanate.

Diols (b1) of a higher molecular weight, having a number-average molecular weight (Mn) of from approximately 500 to 5000, preferably from approximately 700 to 3000 g/mol, particularly preferably 800 to 2500 g/mol, are in particular possible as the diols (b).

According to the invention, the diols (b1) are polyester polyols.

In addition to the diols (b1), diols (b2) of a low molecular weight, having a molecular weight of from approximately 50 to 500, preferably from 60 to 200 g/mol, can also be used as the diols (b).

In particular the structural components of the short-chain alkanediols mentioned for producing polyester polyols are used as the monomers (b2), which components are, for example, ethylene glycol, 1,2-propanediol, 1,3-propanediol, 1,1-dimethylethane-1,2-diol, 2-butyl-2-ethyl-1,3-propanediol, 2-ethyl-1,3-propanediol, 2-methyl-1,3-propanediol, neopentyl glycol, hydroxypivalic acid neopentyl glycol ester, 1,2-, 1,3- or 1,4-butanediol, 1,6-hexanediol, 1,10-decanediol, bis-(4-hydroxycyclohexane)isopropylidene, tetramethyl cyclobutanediol, 1,2-, 1,3- or 1,4-cyclohexanediol, cyclooctanediol, norbornanediol, pinanediol, decalin diol, 2-ethyl-1,3-hexanediol, 2,4-diethyl-octane-1,3-diol, hydroquinone, bisphenol A, bisphenol F, bisphenol B, bisphenol S, 2,2-bis(4-hydroxycyclohexyl)propane, 1,1-, 1,2-, 1,3- and 1,4-cyclohexanedimethanol, 1,2-, 1,3- or 1,4-cyclohexanediol, the unbranched diols having 2 to 12 C atoms and an even number of C atoms, as well as pentanediol-1,5 and neopentyl glycol, being preferred.

In order for the polyurethanes to be able to disperse in water, the polyurethanes are, in addition to components (a) and (b), preferably made up of monomers which are different from components (a), (b) and which carry at least one isocyanate group or at least one group that reacts with isocyanate groups and also carry at least one hydrophilic group or a group that can be converted into hydrophilic groups. The term "hydrophilic groups or potentially hydrophilic groups" shall hereinafter be shortened to "(potentially) hydrophilic groups". The (potentially) hydrophilic groups react with isocyanates in a substantially slower manner than the functional groups of the monomers that are used to make up the main polymer chain. The (potentially) hydrophilic groups can be non-ionic or preferably ionic, i.e. cationic or anionic, hydrophilic groups or potentially ionic hydrophilic groups, and particularly preferably anionic hydrophilic groups or potentially anionic hydrophilic groups.

Mixed or pure polyethylene glycol ethers made up of preferably 5 to 100, more preferably 10 to 80 ethylene oxide repeat units, for example, are possible as non-ionic hydrophilic groups. The polyethylene glycol ethers can also include propylene oxide units. If this is the case, the content of propylene oxide units should not exceed 50 wt. %, preferably 30 wt. %, based on the mixed polyethylene glycol ether.

In this case, the monomer selection is carried out such that the polyurethane, in particular the aliphatic polyurethane, has a glass transition temperature Tg of from 0° C. to −65° C., preferably from −60° C. to −20° C., more preferably from −55° C. to −30° C.

Suitable polyurethanes are for example described in WO2016/169752 A1, which is hereby included by reference.

Most particularly preferably, a polyurethane having the brand name Tubicoat PUS from CHT R. BEITLICH GMBH is used.

The textile composite according to the invention can consist only of a support layer and a flow layer. It is also conceivable, however, for the textile composite to have further layers, in particular at least a cover layer arranged on the flow layer. In this case, the cover layer is preferably arranged on the side of the flow layer facing away from the support layer. This has the advantage that the flow layer can be better protected from damage. It has been found to be particularly suitable to use meltspun nonwovens as the cover layer. The weight per unit area of the cover layer is preferably less than 25 g/m$^2$, for example from 12 g/m$^2$ to 17 g/m$^2$. Likewise preferably, the cover layer consists of thermoplastic filaments, in particular polypropylene filaments.

The support layer, the flow layer and, where present, the cover layer can be joined to one another in various ways. For example, it is conceivable for the layers to be bonded to one another by means of adhesive materials. In a preferred embodiment of the invention, joining to the flow layer is effected by foaming the foam layer directly onto the support layer. It is thereby possible to obtain a textile composite in which no definite phase boundary between the support layer and the flow layer is discernible. This allows a density gradient to be established in the boundary region of the support layer and the flow layer, which has an advantageous effect on the acoustic properties. Furthermore, an additional adhesive layer can be omitted, which likewise has an advantageous effect on the acoustic properties.

According to the invention, the textile composite has a flow resistance of from 250 Ns/m$^3$ to 5000 Ns/m$^3$, preferably from 350 Ns/m$^3$ to 5000 Ns/m$^3$, more preferably from 450 Ns/m$^3$ to 5000 Ns/m$^3$ and in particular from 550 Ns/m$^3$ to 5000 Ns/m$^3$. The flow resistance of the textile composite is composed of the flow resistances of the support layer and the flow layer. The flow layer thereby generally contributes a significantly higher proportion to the flow resistance. The flow resistance can therefore be adjusted in a simple manner by selecting a suitable flow layer having the desired flow resistance.

Outstanding sound absorption coefficients can be achieved using the textile composite according to the invention, for example from 30% to 100%, preferably from 40% to 100%, more preferably from 50% to 100%, in each case at 1000 Hz, measured in accordance with DIN ES ISO 10534-1. These high sound absorption coefficients were surprising to a person skilled in the art because they are higher than the sum of the sound absorption coefficients of the flow layer and the support layer when they are measured individually.

The weight per unit area of the textile composite is preferably from 50 g/m$^2$ to 350 g/m$^2$, more preferably from 100 g/m$^2$ to 300 g/m$^2$ and in particular from 150 g/m$^2$ to 250 g/m$^2$. The advantage of these weights per unit area is that a lightweight textile composite can be provided, meaning that the vehicle emissions can in turn be lowered owing to the weight saving.

The thickness of the textile composite is preferably from 5 mm to 35 mm, more preferably from 10 mm to 30 mm and in particular from 15 mm to 25 mm. The advantage of thicknesses of at least 10 mm is that a high wall spacing is already produced by the textile composite alone, and therefore the medium-length acoustic sound waves of the middle frequencies and the long sound waves of the low frequencies can also be absorbed within the textile composite.

The invention further provides a method for producing the textile composite according to the invention having a flow resistance of from 250 Ns/m$^3$ to 5000 Ns/m$^3$, comprising the following steps:

providing and/or producing at least one open-pore support layer comprising coarse staple fibers having a titer of from 3 dtex to 17 dtex and fine staple fibers having a titer of from 0.3 dtex to 2.9 dtex as scaffold fibers;

providing and/or producing a flow layer comprising a microporous foam layer;

arranging the flow layer on the support layer;

connecting the support layer and the flow layer;

In a further preferred embodiment of the invention, joining to the flow layer is effected by forming the foam layer directly on the support layer. The invention therefore further provides a method for producing the textile composite according to the invention having a flow resistance of from 250 Ns/m$^3$ to 5000 Ns/m$^3$, comprising the following steps:

providing and/or producing at least one open-pore support layer comprising coarse staple fibers having a titer of from 3 dtex to 17 dtex and fine staple fibers having a titer of from 0.3 dtex to 2.9 dtex as scaffold fibers;

forming the microporous foam layer on the support layer by forming a flow layer.

The provision and/or production of at least one open-pore support layer can take place by production processes known to a person skilled in the art, for example by production processes for dry-laid staple fiber nonwovens. Processes which are suitable according to the invention for producing the support layer are, for example, carding processes as well as aerodynamic processes, such as the airlay and airlaid process. In the conventional carding process, the staple fibers are generally stripped down by means of worker-strippers to the level of individual fibers and deposited as a card web. This can subsequently be doubled, for example by means of a crosslapper, in order to form single- or multilayer nonwovens. If a nonwoven having fibers in a tangled arrangement is to be produced, aerodynamic processes are particularly suitable. A tangled arrangement is advantageous because it is thereby possible to obtain voluminous, pressure-resilient nonwovens which at the same time have a low density. If binding fibers are used, these can be heated to melting point in a continuous furnace, for example, and thus serve to bond the nonwoven. Thermal bonding can take place before and/or after the support layer and the flow layer have been connected together. Further contactless types of bonding, such as applying a binder, are also possible. The nonwoven is particularly preferably bonded without mechanical bonding methods so as not to impair the voluminosity of the support layer.

The foam layer can be produced in the conventional manner by foaming polymer dispersions or polymer emulsions, for example by mechanical whipping, and applied by conventional application methods, for example by means of a transfer sheet.

The support layer and the flow layer can be connected in a manner known to a person skilled in the art, for example by means of a hotmelt adhesive or pressure-sensitive adhesive. Preferably, however, a foam layer is used which is adhesive enough to be connectable to the support layer even without an additional adhesive being required.

In a preferred embodiment of the invention, the flow layer is formed directly on the support layer and/or on the cover layer. This can take place for example by means of direct foaming on the relevant layer. In this embodiment, the possibility of avoiding forming a defined phase boundary between the support layer/cover layer and the flow layer is advantageous. This allows a material gradient to be established in the boundary region of the support/cover layer and the flow layer, which in turn has an advantageous effect on the acoustic properties. Furthermore, an additional adhesive layer can be omitted, which again has an advantageous effect on the acoustic properties.

In order to protect the flow layer, it can optionally be provided with a cover layer, as described above. This is advantageous for sensitive foams in particular.

The textile composite according to the invention is outstandingly suitable for sound absorption in the automotive field, for example as an acoustic component for vehicle interiors and in particular as a sound-absorbing insert in cladding parts of motor vehicles.

The invention is explained in greater detail below by means of a number of examples.

Textile Composite According to the Invention
(Example 1)

A staple fiber nonwoven having a weight per unit area of 200 g/m$^2$ and a thickness of 21 mm is provided, which nonwoven consists of fine PET staple fibers of 1.7 dtex and a fiber length of 38 mm and coarse PET staple fibers having a fineness of 3.3 dtex and a fiber length of 64 mm and PET/Co-PET bicomponent fibers of 4.4 dtex and a fiber length of 51 mm. The staple fiber nonwoven is bound both thermally and by means of a binder. A microporous polyurethane foam layer having a weight per unit area of 17 g/m$^2$, a thickness of 0.1 mm and an average pore diameter of 11.1 μm is applied to the staple fiber nonwoven.

Comparative Example 2: Flow Layer with Unoptimized Support Layer

A staple fiber nonwoven having a weight per unit area of 300 g/m$^2$ and a thickness of 20 mm is provided, which nonwoven consists of coarse PET staple fibers having a fineness of 28 dtex and PET/Co-PET bicomponent fibers of 10 dtex. A microporous polyurethane foam layer having a weight per unit area of 17 g/m$^2$, a thickness of 0.1 mm and an average pore diameter of 11.1 μm is applied to the staple fiber nonwoven.

In regard to Example 1 and Comparative Example 2, the flow resistances of the support layers and of the flow layers were measured independently of one another and in combination in accordance with DIN EN 29053.

As the flow layer is a microporous foam layer which, alone, is not sufficiently strong, the microporous PU foam layer according to the invention was applied to a light spunbonded nonwoven, which itself has a very low flow resistance, namely of 23 Ns/m$^3$, in order to be able to ensure the measurement of the flow resistance without, as far as possible, influencing said measurement.

| Test samples | Thickness in mm | Flow resistance in Ns/m$^3$ |
|---|---|---|
| Support layer Example 1 | 21.0 | 67 |
| Support layer Comparative Example 2 | 20.0 | 25 |
| Flow layer Example 1 and Comparative Example 2 (including spunbonded nonwoven) | 0.20 | 2614 |
| Example 1 | 21.2 | 2749 |
| Comparative Example 2 | 20.2 | 2989 |

It is apparent that the high flow resistances are achieved almost exclusively by the flow layer, and the support layer has almost no influence on establishing the flow resistance. In addition, it is apparent that the total flow resistances from Example 1 and Comparative Example 2 are similar.

Comparative Example 3: 3M Thinsulate (TAI3027)

A staple fiber nonwoven having a weight per unit area of 330 g/m² and a thickness of 21 mm is provided, which nonwoven consists of 65 wt. % fine polypropylene meltblown fibers and 35 wt. % coarse PET staple fibers. In addition, a cover layer of 100 wt. % polypropylene is situated on one side of the staple fiber nonwoven.

Example 4

A staple fiber nonwoven having a weight per unit area of 200 g/m² and a thickness of 10 mm is provided, which nonwoven consists of 50 wt. % fine PET staple fibers of 0.6 dtex and 50 wt. % coarse PET staple fibers having a fineness of 4.4 dtex.

Example 5

A staple fiber nonwoven having a weight per unit area of 200 g/m² and a thickness of 10 mm is provided, which nonwoven consists of 80 wt. % fine PET staple fibers of 0.6 dtex and 20 wt. % coarse PET staple fibers having a fineness of 4.4 dtex.

The sound absorption coefficients of Example 1 and Comparative Examples 2 and 3 were measured in accordance with DIN EN ISO 10534-1, Part 1. The results are shown in FIG. 1.

It is apparent that Example 1 exhibits outstanding acoustic absorption properties in the frequency range of from 800 Hz to 2000 Hz that is significant for the automotive industry. At 1000 Hz, a sound absorption coefficient of 50% was achieved, which is surprisingly high. In the case of Comparative Example 2, a value of only 24% was measured at 1000 Hz, and in the case of Comparative Example 3 a value of only 25% was measured at 1000 Hz. Overall, in the frequency range of approximately from 800 Hz to 2500 Hz, a surprisingly higher sound absorption coefficient can be observed in the case of the textile composite according to the invention, even though the weight per unit area of Example 1 is lower compared with Comparative Examples 2 and 3.

It is known that the absorptive capacity of a porous absorber is established via the flow resistance in combination with the wall spacing. The same wall spacing is chosen in all the examples, and therefore it cannot have any influence on the result. Considering Example 1 and Comparative Example 2, it is thus apparent that the total flow resistances of Example 1 and Comparative Example 2 are very similar (see section 3 above), and therefore this parameter cannot be responsible for the unexpected improvement in the sound absorption coefficient.

Without committing to a mechanism according to the invention, it is supposed that this surprisingly higher sound absorption coefficient is attributable to a synergistic interaction between the fine fibers and the coarse fibers of the support layer in combination with the flow layer. Thus it is supposed that the particular selection of fine staple fibers having a titer of from 0.3 dtex to 2.9 dtex and coarse staple fibers having a titer of from 3 dtex to 17 dtex in the support layer permits the formation of a scaffold structure that is particularly suitable for sound absorption and is itself capable of absorbing sound waves. This is because the suitable selection of fine and coarse staple fibers makes it possible to provide the support layer with high compressibility and high resilience, so that the support layer is optimally excited to oscillation by the sound waves, and sound energy can thus be absorbed particularly efficiently.

The textile composite according to the invention in this case acts as a flexible panel absorber. Panel absorbers are highly efficient absorbers which can be adjusted exactly to the desired frequency ranges. The oscillating mass is provided by the mass of a film or of a thin panel. In the textile composite according to the invention, the oscillating mass is provided by means of the flow layer. In a panel absorber, the compliance of the resonance system is in most cases the compliance of the air cushion between the film or panel and the rear wall. In the textile composite according to the invention, the support layer functions as the compliance. Thus the following structure is preferably chosen for the textile composite according to the invention: flow layer-support layer-wall, wherein owing to the precisely defined very good compression and recovery properties of the support layer, the flow layer is able to optimally oscillate on the support layer, and thus internal losses additionally arise in the spring volume, that is to say within the support layer.

In summary, this means that, by means of the selection according to the invention of a specific support layer having high compressibility and high resilience, the mode of action of the flow layer as a porous absorber with additional damping in the support layer can be expanded and thus the sound absorption coefficient, in particular in the frequency range of from 800 Hz to 2000 Hz that is significant for automotive manufacturers, can be increased by means of the interplay of the modes of action of the porous absorber and of the flexible panel absorber.

Figure 2:
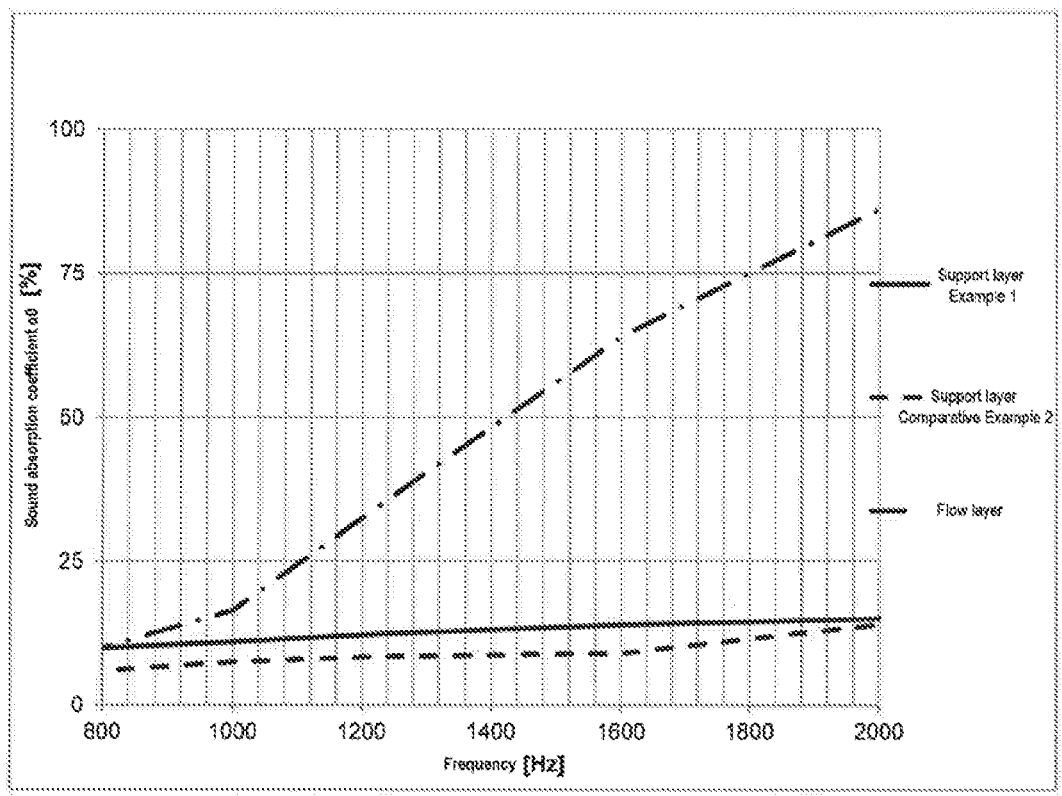
FIG. 2: Comparison of the sound absorption coefficient in the impedance tube (DIN EN ISO 10534) of the flow layer used in Example 1 according to the invention and Comparative Example 2 (applied to a support that is not acoustically effective) with the support layer used in Example 1 according to the invention and with the support layer used in Comparative Example 2.
Figure 3:
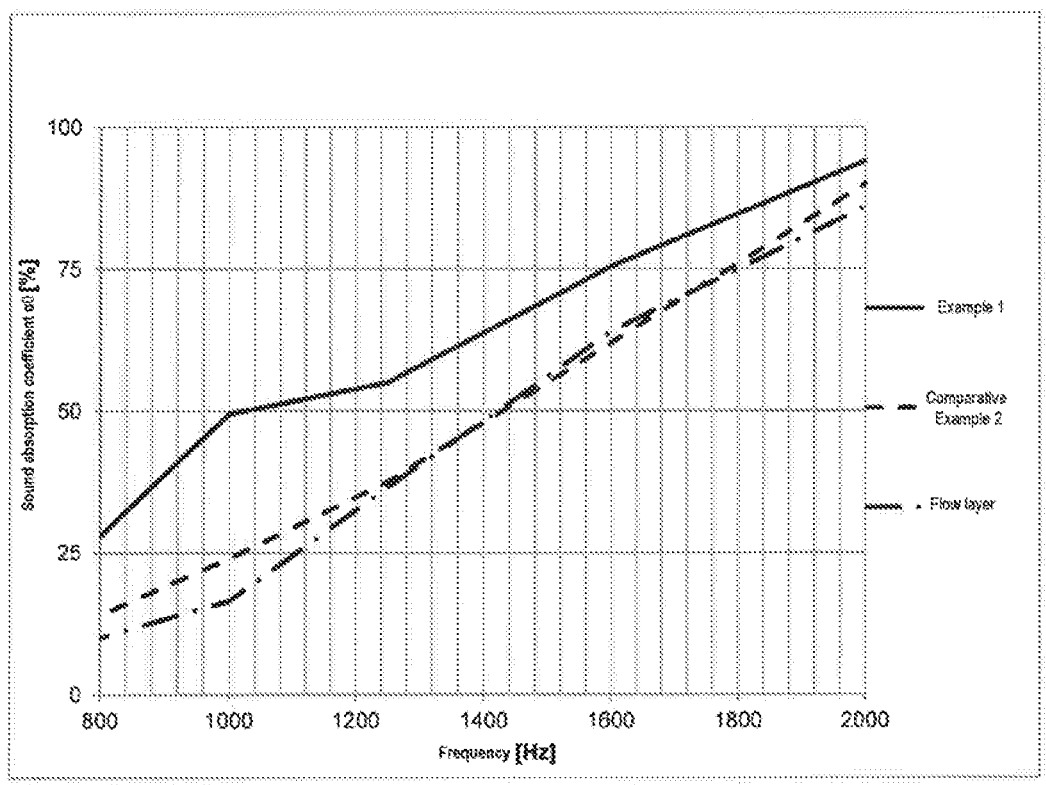
FIG. 3: Comparison of the sound absorption coefficient in the impedance tube (DIN EN ISO 10534) of Example 1 according to the invention, Comparative Example 2 and the insulated flow layer (applied to a support that is not acoustically effective).

The surprising synergistic effect of the above-described acoustic modes of action is also demonstrated by a comparison of FIGS. 2 and 3.

In FIG. 2, only the individual layers used in the examples are initially considered. Specifically, the sound absorption coefficient in the impedance tube (DIN EN ISO 10534) of the flow layer used in Example 1 according to the invention and Comparative Example 2 is compared with the support layer used in Example 1 according to the invention and with the support layer used in Comparative Example 2. As with the measurements of the flow resistance, in order to carry out the test, the microporous foam layer is also applied to a light spunbonded nonwoven for the measurements in the impedance tube. It is apparent that the support layers have approximately comparable sound absorption coefficients, whereas the flow layer has higher sound absorption coefficients. Thus, at 1000 Hz, the support layer of Example 1 exhibits a sound absorption coefficient of approximately 11%, the support layer of Comparative Example 2 exhibits a sound absorption coefficient of approximately 8% and the flow layer exhibits a sound absorption coefficient of approximately 17%.

In FIG. 3, the sound absorption coefficient in the impedance tube (DIN EN ISO 10534) of the textile composite according to Example 1, of Comparative Example 2 and of the isolated flow layer are compared. It is apparent that Example 1 according to the invention has significantly higher sound absorption coefficients than both the isolated flow layer and Comparative Example 2. Thus, at 1000 Hz, Example 1 according to the invention exhibits a sound absorption coefficient of approximately 50%, Comparative Example 2 exhibits a sound absorption coefficient of approximately 24% and the flow layer exhibits a sound absorption coefficient of approximately 17%.

The value calculated for Example 1 according to the invention is surprisingly high. It was thus to be assumed that the sound absorption coefficients of the individual layers can approximately be added together. For Comparative Example 2 this would give: 8% [support layer]+17%

[flow layer]=25%—which is very similar to the measured value of 24%. Thus, no synergy effects between the support layer and the flow layer can be seen. For Example 1, on the other hand, a sound absorption coefficient of 11% [support layer]+17% [flow layer]=28% is obtained mathematically. However, a value of 50% was measured, which is 22 percentage points above the calculated value and is presumably attributable to the above-described synergistic effects between the flow layer and the support layer and the particular scaffold structure thereof.

Figure 4:
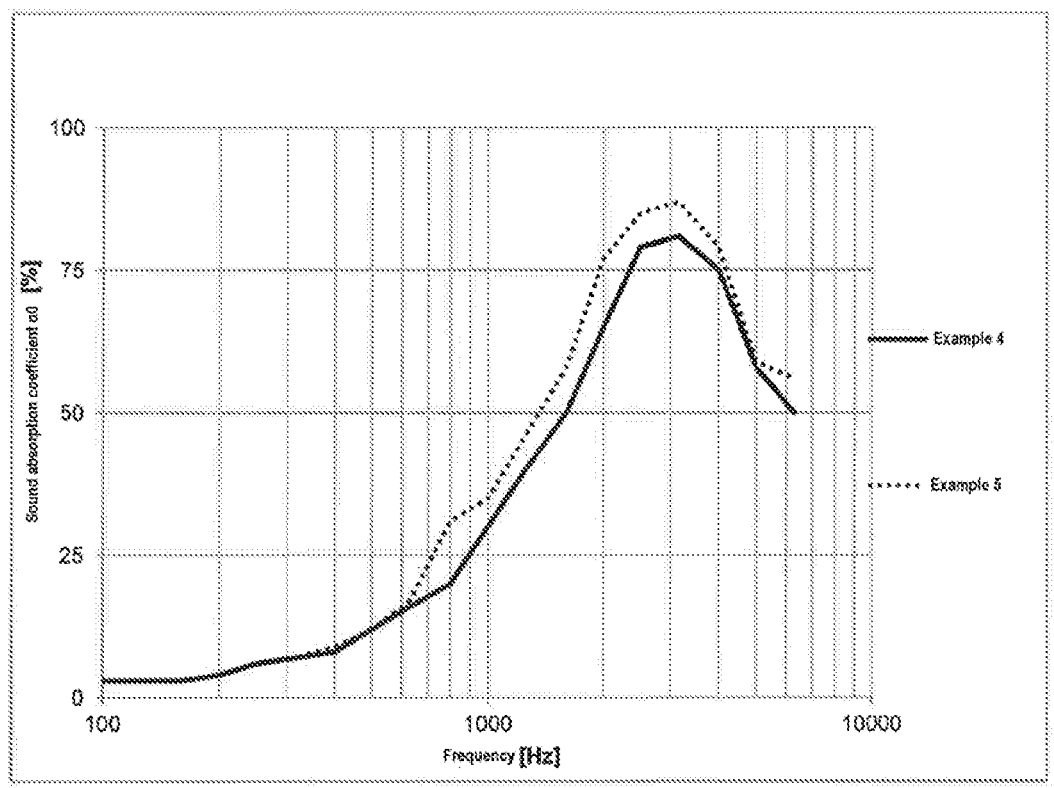
FIG. 4: Comparison of the sound absorption coefficient in the impedance tube (DIN EN ISO 10534) of Example 4 with Example 5.

FIG. 4 shows a comparison of the sound absorption coefficient in the impedance tube (DIN EN ISO 10534) of Example 4 with Example 5. It is apparent that Example 4 (fine fiber content of 80 wt. %) has a higher sound absorption coefficient at 1000 Hz than Example 5 (fine fiber content of 50 wt. %).

The following measurement methods were used to determine parameters used according to the invention:

Test Method for Nonwovens for Determining the Weight Per Unit Area

In accordance with ISO 9073-1, wherein the surface area of the test sample is 100 mm×100 mm.

Test Method for Nonwovens for Determining the Thickness

In accordance with DIN EN ISO 9073-2, methods B and C.

Determination of the Fiber Titer

In accordance with DIN 53810 (Fineness of staple fibers—terms and measuring principles) using a microscope and corresponding software to calculate the fiber diameter. 4 micropreparations of a total of >20 individual fibers are to be prepared. For each micropreparation, fibers are shortened to a length of approximately 2-3 mm using scissors and applied to a specimen holder by means of a dissecting needle. The fiber diameters in μm are then calculated and averaged with the aid of the appropriate software. The averaged fiber diameter can then be converted into the fiber titer Tt using the following formula:

$$Tt[dtex] = \frac{\pi * d^2 * \rho}{400}$$

d fiber diameter in μm
ρ density of the fiber in g/cm³

Determining the pore size distribution of a foam layer

The pore size distribution of the microporous foam layer is measured according to ASTM E1294 (1989).

Test data:
Test device: PMI.01.01
Number of sample specimens: 3
Sample size: Diameter 21 mm
Sample thickness: 1 mm
Test fluid: Galden HT230
Reaction time: >1 min.
Test temperature: 22° C.

Determination of the staple length 10 rovings are selected from a fiber sample, a single fiber being removed from each of the 10 rovings by means of tweezers and the fiber length of the 10 individual fibers being determined by clamping one free end of the fiber into one of the two clamps and clamping the second end of the fiber into the remaining clamp. By turning the handwheel, the fiber is stretched until it is uncurled. The length of the fiber is read off the scale on the measuring device and is noted in mm. The mean of all the recorded results gives the staple length:

$$SP[mm] = \frac{\sum L}{n}$$

ΣL sum of the individual fiber lengths
n number of samples

Determination of the Melting Point

In accordance with DIN EN ISO 11357-3, Differential scanning calorimetry (DSC)—Part 3: Determination of the temperature and enthalpy of melting and crystallization, wherein a heating rate of 10 K/min is used.

Determination of the Compressibility

In accordance with DIN 53885 (Determination of the compression of textiles and textile products), wherein the compressibility is determined by means of a different test device than that described in the standard. A test sample having dimensions of 100 mm×100 mm, a measuring table having a length scale in mm, a metal plate having dimensions of 120 mm×120 mm and a cylindrical weight having a diameter of 55 mm and a mass of one kilogram are provided.

The thickness of the test sample is to be determined prior to the measurement in the unloaded state by means of the measuring table. This value describes the initial thickness $t_0$ in mm. After the initial thickness in the unloaded state has been determined, the metal plate (100 g) is placed on the test sample in the next step and aligned centrally. The cylindrical weight is then placed on the circular marking on the measuring plate, and a load of approximately 1.1 kg is thus applied to the test sample. The absolute compressibility of the test sample is calculated using the following formula and gives the difference between the initial thickness and the thickness in the loaded state:

$$C_a[mm] = t_0 - t_l$$

$t_0$ initial thickness of the test specimen in mm
$t_l$ final thickness of the test specimen in mm under corresponding loading The relative compressibility $C_r$ in % is:

$$C_r[\%] = \frac{C_a}{t_0} * 100$$

Determination of the Resilience

In accordance with DIN EN ISO 1856 (Flexible polymeric foams—determination of compression set). The same setup as already described in the section "Determination of the compressibility" is used as the measuring apparatus. When determining the resilience, the difference between the initial thickness and the final thickness of a material after compressive deformation for a specific time, at a specific temperature and with a given recovery time is determined.

The thickness of the test sample is to be determined prior to the measurement in the unloaded state by means of the measuring table. This value describes the initial thickness $t_0$ in mm. After the initial thickness in the unloaded state has been determined, the metal plate (100 g) is placed on the test sample in the next step and aligned centrally. The cylindrical weight is then placed on the circular marking on the measuring plate, and a load of approximately 1.1 kg is thus applied to the test sample over a period of 24 hours and at room temperature (23° C.+/−2° C.). After 24 hours' loading, the weight and the metal plate are removed from the test sample and the thickness of the test sample is measured again after a recovery time of 30 minutes, and the compression set is determined as follows:

$$CS[\%] = \frac{t_0 - t_r}{t_0} * 100$$

$t_0$ initial thickness of the test specimen in mm
$t_r$ the thickness of the test specimen after recovery The resilience of a material can be calculated from the compression set using the following formula:

$$R[\%] = 100 - CS$$

Determination of the Air:Fiber Volume Ratio

The air-to-fiber volume ratio indicates how porous a material is. It can thus be assumed that, where there is a high proportion of air in comparison with fibers, the material has high porosity. The volume ratio $V_{air}$ to $V_{fiber}$ can be calculated as follows. For this purpose, the volume of the test specimen is first calculated using the following formula:

$$V_{test\ specimen}\ [cm^3] = l*w*t$$

l length of the test specimen in mm
w width of the test specimen in mm
t thickness of the test specimen in mm, measured in accordance with DIN EN ISO 9073-2,
methods B and C.

After the volume of the test specimen has been determined, the volume of the fibers contained in the nonwoven is calculated in the next step using the following formula:

$$V_{fiber}[cm^3] = \frac{m_{fiber}}{\rho_{fiber\ polymer}}$$

$m_{fiber}$ fiber mass of the test specimen in g
$\rho_{fiber\ polymer}$ density of the fiber polymer in g/cm$^3$ Wherein staple fibers of the polymer polyethylene terephthalate are preferably used in the support layer and a fiber density of approximately 1.38 g/cm$^3$ can thus be assumed. After the fiber volume has been calculated, the air volume can then be determined in a further step using the following formula:

$$V_{air}\ [cm^3] = V_{test\ specimen} - V_{fiber}$$

If the air volume and the fiber volume of the test specimen have been determined, these two volume values can then be placed in a ratio with one another.

Test Method for Determining the Flow Resistance

In accordance with DIN EN 29053, method A (direct airflow method), wherein the effective sample diameter is 100 mm and the air pressure corresponds to 1000 mbar.

Test Method for Determining the Sound Absorption Coefficient and Impedance in the Impedance Tube In accordance with DIN EN ISO 10534-1, Part 1: Method using standing wave ratio (ISO 10534-1:2001-10), wherein tube length A corresponds to 100 cm and tube cross section A corresponds to 77 cm$^2$, and tube length B corresponds to 30 cm and tube cross section B corresponds to 6.6 m$^2$. The test specimens of the textile composite and of the support layers are applied directly to the reverberant wall and measured. The flow layer is measured at a distance of 20 mm from the reverberant wall.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A sound-absorbing textile composite having a flow resistance of from 250 Ns/m$^3$ to 5000 Ns/m$^3$, comprising:
    a) at least one open-pore support layer comprising coarse staple fibers having a titer of from 3 dtex to 17 dtex and fine staple fibers having a titer of from 0.3 dtex to 2.9 dtex as scaffold fibers; and
    b) a flow layer arranged on the support layer, which flow layer comprises a microporous foam layer.

2. The sound-absorbing textile composite according to claim 1, the sound-absorbing textile composite having a compressibility of from 70% to 100% and/or a resilience of from 70% to 100%.

3. The sound-absorbing textile composite according to claim 1, wherein the support layer comprises a nonwoven.

4. The sound-absorbing textile composite according to claim 1, wherein the support layer contains at least partially fused binding fibers as further fibers.

5. The sound-absorbing textile composite according to claim 1, wherein the support layer contains the coarse staple fibers in a proportion of from 5 wt. % to 90 wt. % based on a total weight of the support layer.

6. The sound-absorbing textile composite according to claim 1, wherein the support layer contains the fine staple fibers in a proportion of from 10 wt. % to 90 wt. % based on a total weight of the support layer.

7. The sound-absorbing textile composite according to claim 1, wherein the fine and coarse staple fibers used as scaffold fibers have, independently of one another, a staple length of from 20 mm to 80 mm.

8. The sound-absorbing textile composite according to claim 1, wherein the support layer is bound by a binder, and the binder comprises polyacrylates, polystyrenes, polyvinyl acetate-ethylene, polyurethanes and mixtures and copolymers thereof.

9. The sound-absorbing textile composite according to claim 1, wherein the support layer has an air-to-fiber volume ratio of from 50:1 to 250:1.

10. The sound-absorbing textile composite according to claim 1, wherein the microporous foam layer has an average pore diameter in the range of from 1 µm to 30 µm.

11. The sound-absorbing textile composite according to claim 1, wherein the sound-absorbing textile composite has a sound absorption coefficient of from 30% to 100% at 1000 Hz.

12. The sound-absorbing textile composite according to claim 1, wherein the sound-absorbing textile composite has a weight per unit area of from 50 g/m² to 350 g/m².

13. The sound-absorbing textile composite according to claim 1, wherein the sound-absorbing textile composite has a thickness of from 5 mm to 35 mm.

14. A method for producing a textile composite having a flow resistance of from 250 Ns/m³ to 5000 Ns/m³, comprising the following steps:
   a) providing and/or producing at least one open-pore support layer comprising coarse staple fibers having a titer of from 3 dtex to 17 dtex and fine staple fibers having a titer of from 0.3 dtex to 2.9 dtex as scaffold fibers;
   b) providing and/or producing a flow layer comprising a microporous foam layer;
   c) arranging the flow layer on the support layer;
   d) connecting the support layer and the flow layer;
   and/or comprising the following steps:
   a') providing and/or producing at least one open-pore support layer comprising coarse staple fibers having a titer of from 3 dtex to 17 dtex and fine staple fibers having a titer of from 0.3 dtex to 2.9 dtex as scaffold fibers;
   b') forming the microporous foam layer on the support layer by forming a flow layer.

15. The use of a sound-absorbing textile composite according to claim 1 for sound absorption in the automotive field.

16. The sound-absorbing textile composite according to claim 2, the sound-absorbing textile composite having a compressibility of from 75% to 100%.

17. The sound-absorbing textile composite according to claim 16, the sound-absorbing textile composite having a compressibility of from=80% to 100%.

18. The sound-absorbing textile composite according to claim 1, the sound-absorbing textile composite having a resilience of from 75% to 100%.

19. The sound-absorbing textile composite according to claim 18, the sound-absorbing textile composite having a resilience of from 80% to 100%.

20. The sound-absorbing textile composite according to claim 4, wherein the at least partially fused binding fibers comprise core/sheath fibers.

* * * * *